(12) United States Patent
Holt et al.

(10) Patent No.: US 11,624,493 B2
(45) Date of Patent: Apr. 11, 2023

(54) SYSTEMS FOR CONTROLLING A REFLECTOR ARRAY

(71) Applicant: Labsphere, Inc., North Sutton, NH (US)

(72) Inventors: Jeffrey William Holt, Concord, NH (US); William S. Arnold, Enfield, NH (US); Mikayla Johnston, Mesa, AZ (US); Kyle C. Johnston, Mesa, AZ (US)

(*) Notice: Subject to any disclaimer, the term of this patent is extended or adjusted under 35 U.S.C. 154(b) by 0 days.

(21) Appl. No.: 17/660,419

(22) Filed: Apr. 25, 2022

(65) Prior Publication Data
US 2022/0341567 A1    Oct. 27, 2022

Related U.S. Application Data

(60) Provisional application No. 63/178,585, filed on Apr. 23, 2021.

(51) Int. Cl.

| | |
|---|---|
| F21V 7/00 | (2006.01) |
| H02K 7/00 | (2006.01) |
| F21V 7/09 | (2006.01) |
| F21V 7/04 | (2006.01) |
| F21S 11/00 | (2006.01) |
| G02B 7/183 | (2021.01) |
| G02B 7/182 | (2021.01) |

(52) U.S. Cl.
CPC ........... *F21V 7/0025* (2013.01); *F21S 11/002* (2013.01); *F21V 7/041* (2013.01); *F21V 7/09* (2013.01); *G02B 7/183* (2013.01); *G02B 7/1821* (2013.01); *H02K 7/003* (2013.01)

(58) Field of Classification Search
CPC .......... F21V 7/0025; F21V 7/041; F21V 7/09; H02K 7/003; G02B 7/183; G02B 7/1821; F21S 11/002
See application file for complete search history.

(56) References Cited

U.S. PATENT DOCUMENTS

| | | | |
|---|---|---|---|
| 9,709,793 B1 * | 7/2017 | Seltzer ................. | H01Q 1/288 |
| 2006/0012896 A1 * | 1/2006 | Strieber ................. | F24S 23/70 |
| | | | 359/853 |
| 2011/0179791 A1 * | 7/2011 | Butler ..................... | F24S 50/00 |
| | | | 126/684 |
| 2013/0327371 A1 * | 12/2013 | Hui ..................... | H01L 31/0547 |
| | | | 359/853 |

* cited by examiner

*Primary Examiner* — Evan P Dzierzynski
*Assistant Examiner* — Nathaniel J Lee
(74) *Attorney, Agent, or Firm* — Dinsmore & Shohl LLP; Monika L. Jaensson, Esq.

(57) ABSTRACT

A reflector array includes a support structure, a motor, a shaft operatively coupled to the motor, a free plate, and a drive plate. The free plate includes a free plate first side and a free plate second side axially opposed to the free plate first side. The free plate further may include a latching mechanism disposed on the free plate second side and a drive plate. The drive plate is rotatably coupled to the shaft. The drive plate includes a drive plate first side and a drive plate second side axially opposed to the drive plate first side. The drive plate further includes a drive plate finger coupled to the drive plate second side. The drive plate finger is configured to contact the latching mechanism in response to rotation of the driver plate. The drive plate finger is further configured to couple the drive plate to the free plate.

20 Claims, 14 Drawing Sheets

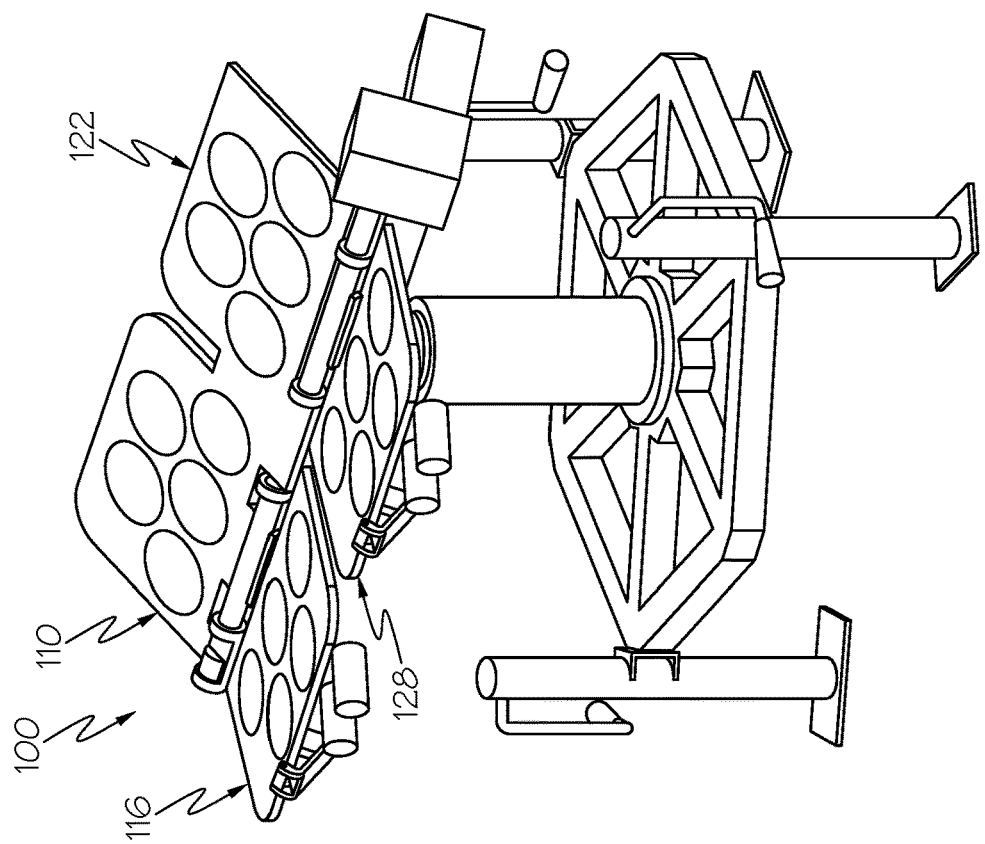
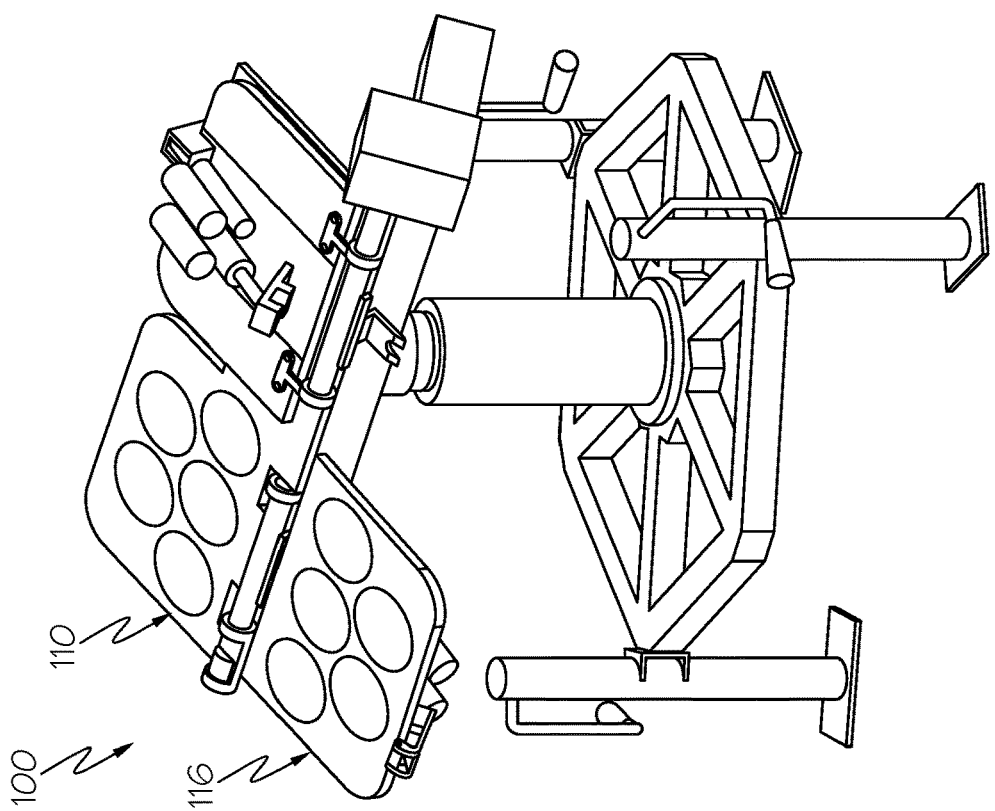

SYSTEMS FOR CONTROLLING A REFLECTOR ARRAY

CROSS-REFERENCE TO RELATED APPLICATION

This application is a non-provisional application claiming priority to U.S. Patent Application Ser. No. 63/178,585, filed on Apr. 23, 2021, which is hereby incorporated by reference in its entirety including the drawings.

TECHNICAL FIELD

The present specification generally relates to apparatus for a reflector array and, more specifically, apparatus for controlling a reflector array.

BACKGROUND

Reflector arrays are devices used to reflect illumination to targeted systems. Conventional reflector arrays are subject to harsh conditions, making their calibrations viable only over short time spans or a limited number of campaigns.

Accordingly, a need exists for an improved reflector array that may be modular, controlled remotely, and is protected from its environments when not in use.

SUMMARY

In one embodiment, apparatus for a reflector array includes a support structure, a motor, a shaft operatively coupled to the motor, a free plate, and a drive plate. The free plate defines a free plate plane. The free plate includes a free plate first side and a free plate second side axially opposed to the free plate first side. The free plate further includes one or more free optical surfaces disposed on the free plate first side. The drive plate is rotatably coupled to the shaft. The drive plate includes a drive plate first side and a drive plate second side axially opposed to the drive plate first side. The drive plate further includes one or more drive optical surfaces disposed on the drive plate first side. The drive plate further includes a drive plate finger coupled to the drive plate second side. The drive plate finger extends from the drive plate second side to the free plate second side. The drive plate finger is configured to contact the free plate in response to rotation of the drive plate. The drive plate finger is further configured to couple the drive plate to the free plate in response to contacting the free plate.

In another embodiment, apparatus for an assembly includes a support structure and a reflector array. The reflector array includes a base plate, a first plate, a second plate, and a third plate. The base plate includes a first edge, a second edge, a third edge and one or more base optical surfaces. The first plate is hingedly coupled to the first edge. The first side includes one or more first plate optical surfaces. The second plate is hingedly coupled to the second edge. The second side includes one or more second plate optical surfaces. The third plate is hingedly coupled to the third edge. The third side includes one or more third plate optical surfaces. In a closed position of the assembly, a first side and second side of each of the first plate, second plate, and the third plate intersect at an intersection point. In a fully open position of the assembly, the first side and second side of each of the first plate, second plate, and the third plate and the base plate define a plane.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6C schematically depicts the reflector array of FIG. 6A in a third position;

FIG. 6D schematically depicts the reflector array of FIG. 6A in a fourth position;

DETAILED DESCRIPTION

Figure 1A:
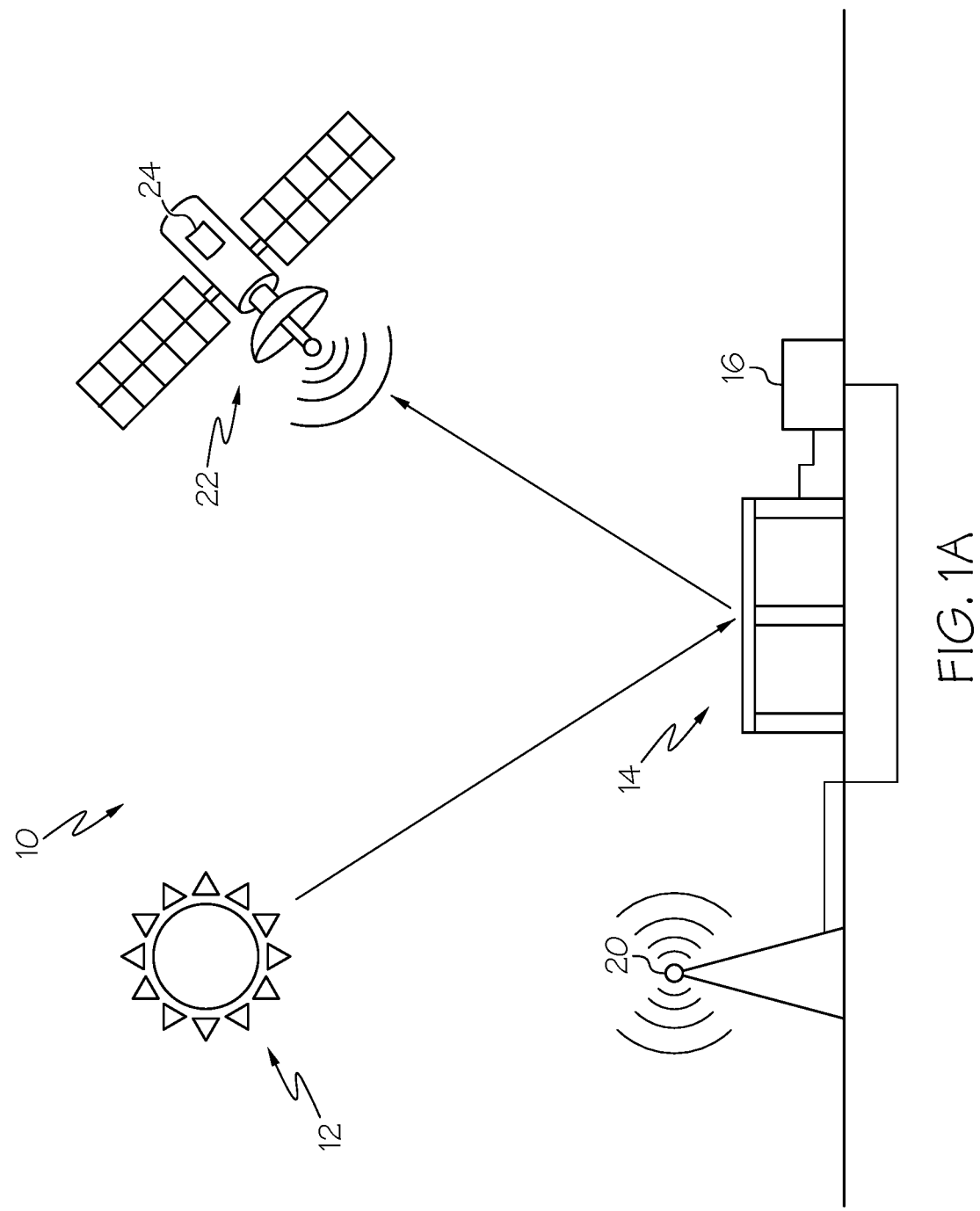
FIG. 1A schematically depicts an environment of a reflector array, according to one or more embodiments shown and described herein.

Embodiments described herein are directed to systems to control a field spectral reflector array, or reflector array for short. The reflector array may be controlled remotely or autonomously, so that it may optimally operate during short time spans, while illumination conditions are stable. As discussed in greater detail herein, embodiments of the reflector array include a latching mechanism to control the use of a drive plate and a free plate of the reflector array, where each of the drive plate and the free plate include optical surfaces. In these embodiments, the reflector array may be in a fully open position, where both the optical surfaces of the drive plate and the free plate are in use, or in an offset position, where only the optical surface of the drive plate are in use. In embodiments, the reflector array includes a closing latching mechanism to protect the optical surfaces in a fully closed position.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1A, a system 10 is illustrated according to one or more embodiments described herein. The system 10 may generally include an illumination source 12, a reflector array 14, and a control system 16. The system 10 is generally configured to direct light from the illumination source 12 to an imaging system 22 to facilitate calibration of the imaging system 22 while the imaging system 22 is in deployment. The illumination source 12 provide illumination light for generating samples for the imaging system 22. In the example shown, the illumination source 12 is sunlight, though other illumination sources are contemplated and within the scope of the present disclosure. In embodiments, the reflector array 14 and control system 16 are one of a plurality of reference sites that are a part of a calibration network for characterizing the imaging system 22.

The control system 16 communicates with the imaging system 22 via antennas 20 and controls the reflector array 14. In embodiments, the system 10 provides on demand calibration for the imaging system 22 in response to a calibration request. For example, in embodiments, the imaging system 22 transmits the calibration request to the system 10 (e.g., via any known communication protocol). The calibration request may indicate a calibration time when the reflector array 14 is within a field of view of the imaging system 22. At the indicated time, the control system 16 may control a radiometer either communicatively coupled to or integrated with the reflector array 14 to obtain measurements of one or more of solar radiance, atmospheric transmission, and reflectance. The control system 16 may also control the reflector array 14 to direct illumination light from the illumination source 12 to the imaging system 22 for calibration. The spectral radiance and/or irradiance of the illumination source 12 (e.g., of the sun and sky), atmospheric transmission, and the like may be measured by the radiometer. In embodiments, the orientation of the reflector array 14 is adjustable to acquire a complete survey of the environment of the reflector array 14 to facilitate proper adjustments to the samples generated by the imaging system 22.

The imaging system 22 is depicted as a satellite imaging system, but it should be understood that the systems and methods described herein are applicable to any airborne imaging system (e.g., imaging systems disposed on unmanned aerial vehicles, aircrafts, airborne autonomous vehicles, ground-based autonomous vehicles). In the depicted embodiment, the imaging system 22 includes one or more sensors 24. The one or more sensors 24 are generally configured to generate images based on radiation within a wavelength range of interest. The wavelength range of interest may vary depending on the implementation. For example, in embodiments, the one or more sensors 24 may generate images based on one or more of ultraviolet radiation, visible light, infrared radiation, and even the millimeter wavelength range or radio frequency, depending on the implementation.

The imaging system 22 may perform a number of different types of imaging of targets depending on the situation or implementation. For example, in embodiments, the imaging system is a remote sensing system using broad-band, multi-spectral, and/or hyperspectral imaging instruments. In other examples, the imaging system may be similar to the imager characterization system disclosed in U.S. Patent Application Publication No. 2021/0382264 A1, to the calibration network system disclosed in U.S. Patent Application Publication No. 2021/0383573 A1, or to the imager characterization system disclosed in U.S. Patent Application Publication No. 2021/0381891 A1, each of which publications is hereby incorporated by reference into this present disclosure, in their entirety. Such instrumentation requires proper calibration in order to achieve reliable characterizations of the targets being imaged because the acquired imaging signal by the one or more sensors 24 may vary depending on a number of different factors, such as angle of illumination (e.g., orientation of the illumination source 12), the spectral composition of illumination light from the illumination source 12, atmospheric conditions, and reflectance of surfaces disposed proximate to the reflector array 14 (e.g., the bidirectional reflectance distribution function ("BRDF") of the surface upon which the reflector array 14 is disposed). To facilitate accurate calibration of a wide array of imaging systems (including the imaging system 22), the radiometer communicatively coupled to or integrated with the reflector array 14 includes two or more optical paths coupled to detector paths specifically designed for different optical channels (e.g., wavelength ranges of interest), providing for high dynamic range and low signal to noise environmental measurements across a large spectral range. While the reflector array 14 is depicted to be a component of the system 10, it should be appreciated that the reflector array 14 may find use in a wide variety of other contexts or as a standalone device. The reflector array 14 may find use in any application where it is beneficial to gather information regarding solar illumination and/or surface reflectance. For example, information generated by the reflector array 14 may provide inputs in atmospheric science (e.g., to collect information regarding sunlight, in studying climate, in developing weather models). In embodiments, the reflector array 14 may be used in photovoltaic installations. In embodiments, the reflector array 14 may be implemented in farming or agricultural sites for solar and/or surface monitoring. The present disclosure is not limited to any particular application.

Figure 1B:
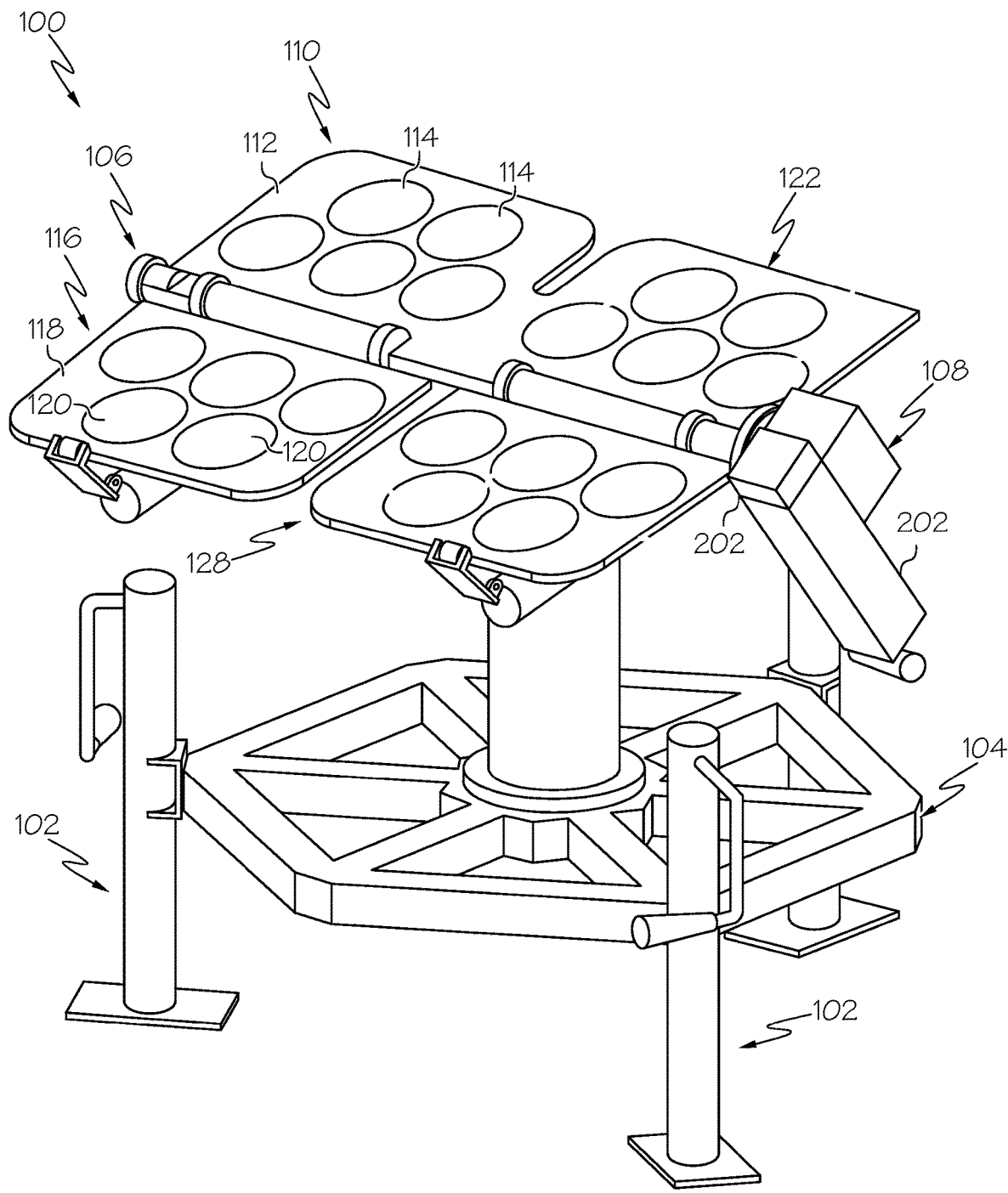
FIG. 1B schematically depicts a reflector array in a fully open position, according to one or more embodiments shown and described herein.

Referring now to FIG. 1B, a reflector array 100 is shown. The reflector array 100 may be similarly utilized as the reflector array 14 disclosed in FIG. 1A. The reflector array 100 includes a support structure 102, a shaft 106, a motor 108, a first drive plate 110 and a first free plate 116. The support structure 102 structurally supports the reflector array 100. The support structure 102 may include one or more legs mounted to the floor and a base 104 extending in between the one or more legs. The support structure may be coupled (e.g., via fastening, welding) to a floor or surface to further support the reflector array 100 during rotational movement of the reflector array 100.

The motor 108 is operatively coupled to the shaft 106 and is configured to rotate the shaft 106. The motor 108 may be an electronic motor, a servo motor, or any suitable device for rotating the shaft 106. The shaft 106 extends between the first drive plate 110 and the first free plate 116. The shaft 106 is rotatably coupled to the first drive plate 110 and is configured to rotate the first drive plate 110 in response to operation of the motor 108.

The drive plate 110 includes a drive plate first side 112, a drive plate second side 113 (shown in FIG. 2A), and one or more drive optical surfaces 114 disposed on the drive plate first side 112. The drive plate second side 113 is axially opposed to the drive plate first side 112. The one or more drive optical surfaces 114 are convex mirrors used to reflect an illumination source to an imaging system (e.g., a satellite as in FIG. 1A, a camera). The one or more drive optical surfaces 114 each define a field of regard, which is a cone in space over the one or more drive optical surfaces 114 where the reflected source is observable by the imaging system 22. Each of the one or more drive optical surfaces 114 may define a radius of curvature and overall diameter. The radius of curvature defines the magnification of reflection from the drive optical surface 114. The overall diameter of the one or more drive optical surfaces 114, in combination with the radius of curvature, defines the field of regard for each of the one or more drive optical surfaces 114. The one or more drive optical surfaces 114 each define their own field of regard. Each of the one or more drive optical surfaces 114 may define differing radii of curvature and overall diameter. In this way, the drive plate 112 may have varying magnification and varying field of regards on the same drive plate 112.

The drive plate 110 defines a drive plate plane extending along a surface of the drive plate first side 112. The angle of the drive plate plane rotates in response to operation of the motor 108 via the shaft 106. In this way, the field of regard of each of the one or more drive optical surfaces 114 may be adjusted for the reflector array 100.

Figure 6B:
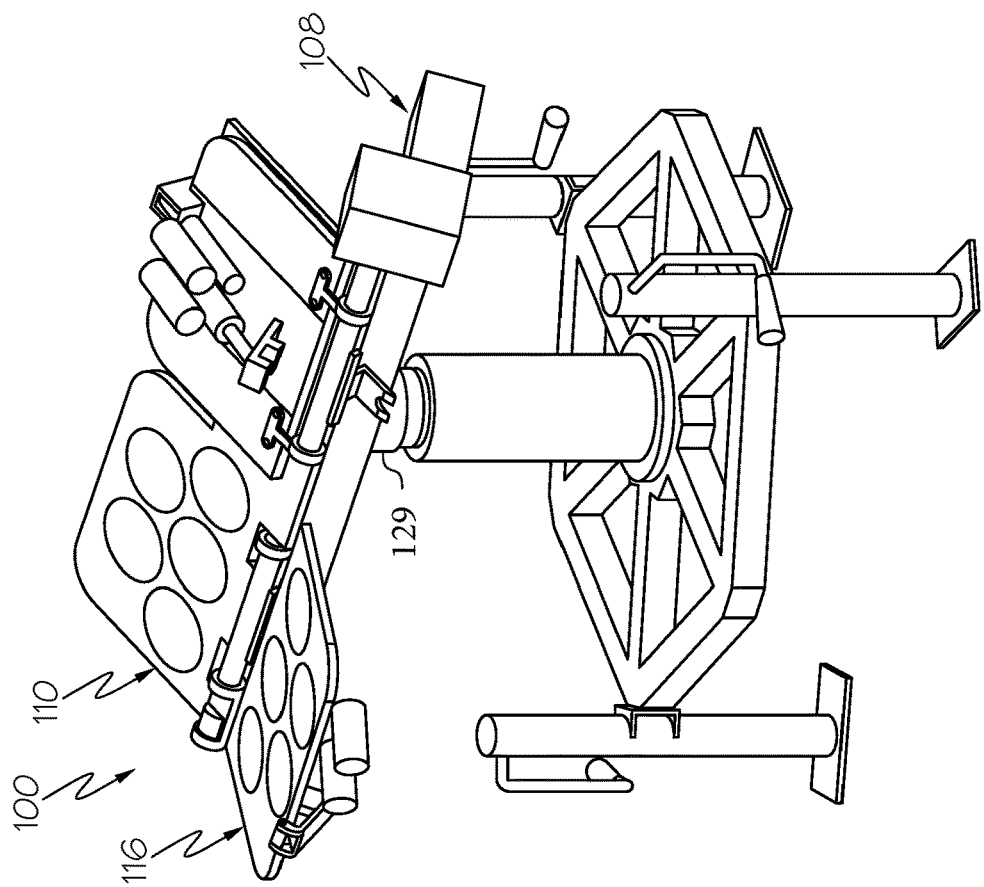
FIG. 6B schematically depicts the reflector array of FIG. 6A in a second position.

Further, the reflector array 100 may include a second motor assembly 129 (e.g., shown in FIG. 6B). In embodiments, the second motor assembly 129 may be disposed in the support structure 102. The second motor assembly 129 may include a motor and a gear assembly (not shown) configured to rotate the reflector array 100 relative to the support structure 102. In this way, the field of regard of each of the one or more drive optical surfaces 114 may be further adjusted for the reflector array 100.

As discussed in greater detail herein, a position of the free plate 116 is controlled via the drive plate 110. The free plate 116 includes a free plate first side 118, a free plate second side 119 (shown in FIG. 2A), and one or more free optical surfaces 120 disposed on the free plate first side 118. The free plate second side 119 is axially opposed to the free plate first side 118. The one or more free optical surfaces 120 are convex mirrors used to reflect an illumination source to an imaging system (e.g., a satellite as in FIG. 1A, a camera, a sensor). The one or more free optical surfaces 120 each define their own field of regard. Each of the one or more free optical surfaces 120 may define differing radii of curvature. In this way, the free plate 116 may have varying magnification and varying field of regards on the same free plate 116.

The free plate 116 defines a free plate plane extending along a surface of the free plate first side 118. As discussed in greater detail herein, the angle of the free plate plane rotates in response to rotation of the drive plate 110 via operation of the motor 108. In this way the field of regard of each of the one or more free optical surfaces 120 may be adjusted for the reflector array 100.

In embodiments, the reflector array 100 includes a second drive plate 122 and a second free plate 128. The second drive plate 122 may be structurally similar or identical to the first drive plate 110 and the second free plate 128 may be structurally similar or identical to the first free plate 116. In embodiments, the second drive plate 122 is coupled and/or contiguous to the first drive plate 110, such that the motor 108 simultaneously drives the rotation of the first drive plate 110 and the second drive plate 122. In other embodiments, the first drive plate 110 and the second drive plate 122 are discrete components configured to rotate independently (e.g., via a second motor, a clutch mechanism). The second drive plate 122 defines a second drive plate plane that may be parallel or offset to the first drive plate plane. In this way, the reflector array 100 may be configured to define several fields of regard simultaneously.

The second free plate 128 may be similar or identical in nature to the first free plate 116. The first free plate 116 and the second free plate 128 are discrete components configured to rotate independently of each other via rotational movement of their respective drive plate and operation of the latching mechanism 210 as hereinafter described. The second free plate 128 defines a second free plate plane that may be parallel or offset to the first free plate plane. In this way, the reflector array 100 may be configured to define several fields of regard simultaneously.

Figure 2A:
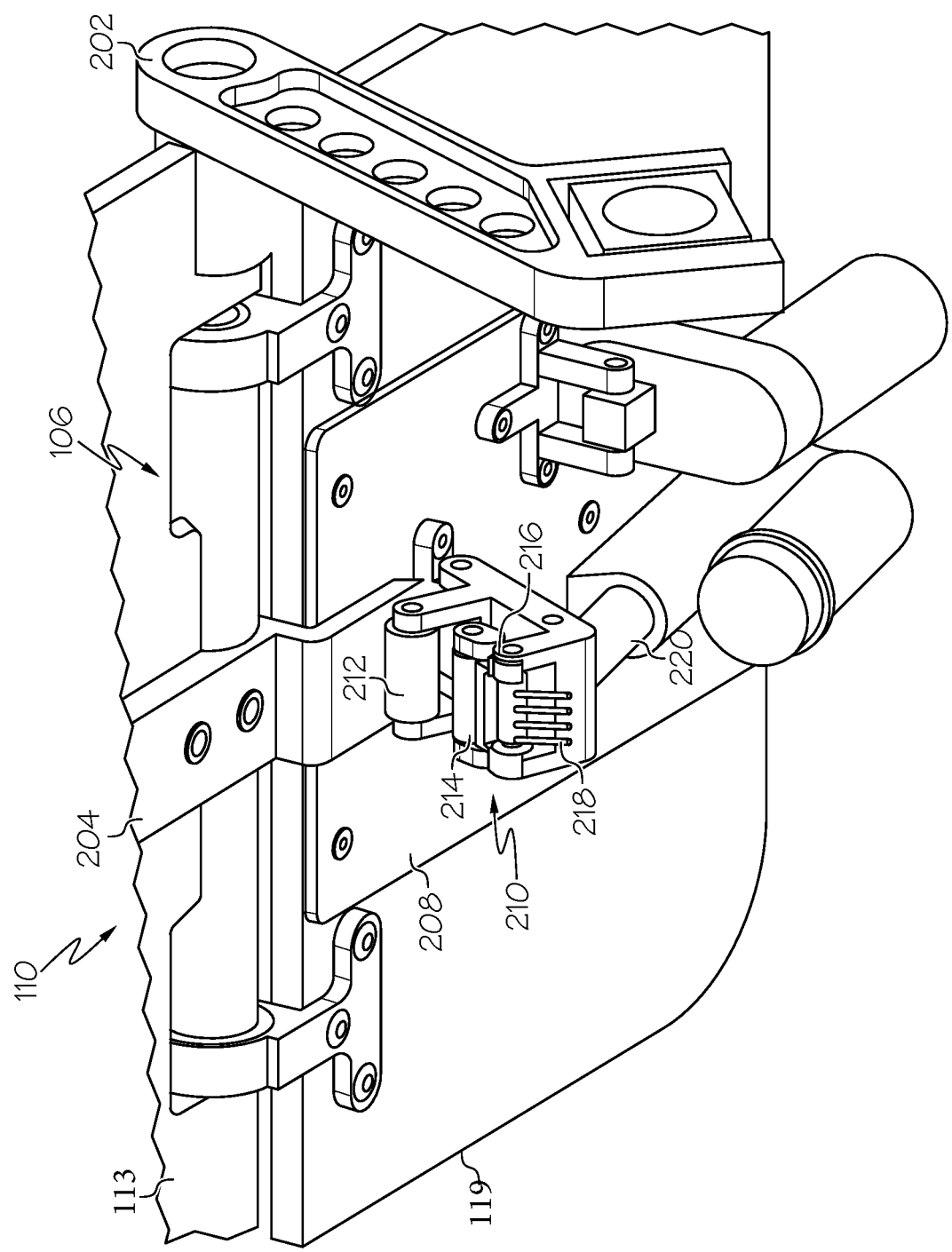
FIG. 2A schematically depicts a latching mechanism of a reflector array in the fully open position, according to one or more embodiments shown and described herein.

Referring now to FIG. 2A, a rear view of the reflector array 100 in a fully open position is shown, according to one or more embodiments. The reflector array 100 further includes a bracket 202, which operatively couples the motor 108 to the shaft 106. The drive plate 110 further includes a drive plate finger 204 coupled to (e.g., fastening, welding) the drive plate second side 113 or integrated into (e.g., molding, machining, forming) the drive plate second side 113. The drive plate finger 204 extends from the drive plate second side 113 to the free plate second side 119. The rotation of the drive plate 110 results in a rotation of the drive plate finger 204.

The free plate 116 includes a mounting plate 208, a latching mechanism 210, and a linear actuator 220. The mounting plate 208 may be coupled to or integrated into the free plate second side 119. The latching mechanism 210 may be coupled to the mounting plate 208 or directly coupled to the free plate second side 119. The linear actuator 220 may be mounted onto the mounting plate 208 and is configured to pull in the latching mechanism 210 in the fully open position, thereby hinging a portion of the latching mechanism 210. The linear actuator 220 may be any powered linear actuator including an electromechanical actuator, a linear actuator, a pneumatic actuator, or hydraulic actuator. In this way, the latching mechanism 210 is in a fixed position. In embodiments, the free plate 116 does not include a latching mechanism 210. In these embodiments, the drive plate finger 204 makes contact directly with the free plate second side 119, thereby coupling the drive plate 110 to the free plate 116.

The latching mechanism 210 includes a first roller 212, a second roller 214, a hinging portion 216 hingedly coupled to the second roller 214, and a spring mechanism 218. As discussed above, the linear actuator 220 hinges the rear portion of the latching mechanism 210 in the fully open position. By doing so, the latching mechanism may be extended such that the first roller 212 operates using a clamping force acting on the drive plate finger 204 against the free plate 119. The drive plate 110 may then rotate the free plate 116 via the drive plate finger 204. In the fully open position, the drive plate plane and the free plate plane extend along the same plane. Accordingly, the reflector array 100 may utilize both the drive plate 110 and the free plate 116 simultaneously. This is advantageous as it allows for a single motion control system (e.g., the motor) to operate two plates having optical surfaces. In this way, these embodiments require less high-precision motion control devices and a lower overall cost of the reflector array 100.

Figure 2B:
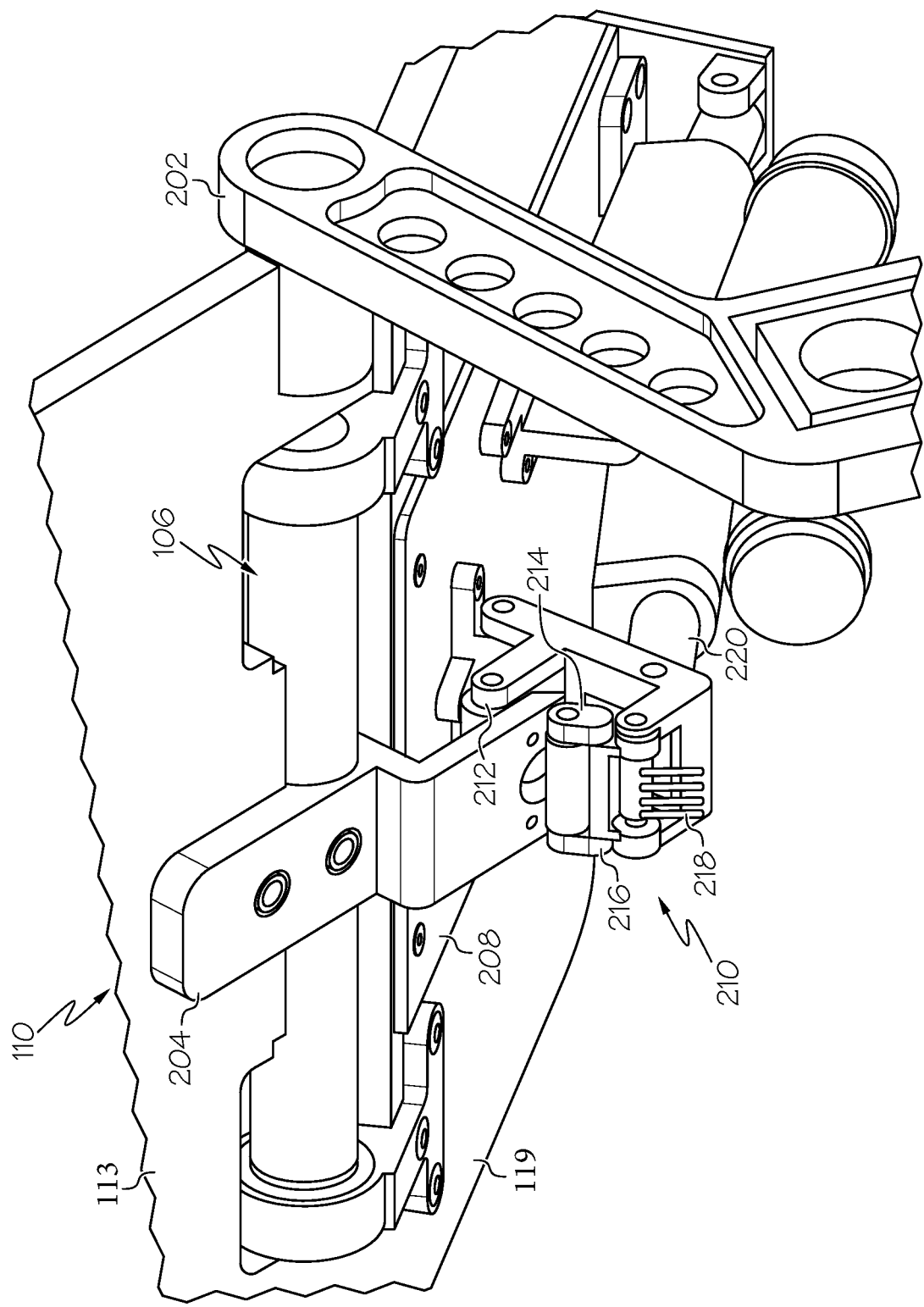
FIG. 2B schematically depicts the latching mechanism of a reflector array in an offset position, according to one or more embodiments shown and described herein.

Referring now to FIG. 2B, a rear view of the reflector array 100 in an offset position is shown, according to one or more embodiments. In the offset position, either the optical surfaces of the drive plate 110 or the optical surfaces of the free plate 116 are in use.

To enter into the offset position, the linear actuator 220 may extend into the latching mechanism 210, prior to rotation of the drive plate 110 in the fully closed position. In this way, the latching mechanism is directed towards the linear actuator 220. The drive plate finger 204 may then rotate and may be received within a finger receiving area defined between the first roller 212 and the second roller 214. In doing so, the drive plate finger 204 comes in contact with and applies a force on the second roller 214. The spring mechanism 218 (e.g., torsion spring) applies a biasing force onto the hinging portion 216. This biasing force is designed to be overcome by the drive plate finger 214 such that the drive plate finger 214 may continue to rotate further to contact the first roller 212 and out of contact with the second roller 216. The second roller 216 will then return to the original position thereby capturing the drive plate finger 204 within the finger receiving area.

In the offset position, the drive plate 110 and the free plate 116 are rotatably coupled, such that rotation of the drive plate 110 rotates the free plate 116. However, the drive plate plane and the free plate plane are offset to each other in the offset position, thereby creating differing fields of regard. In this way, the optical surfaces of the drive plate 110 or the free plate 116 may be utilized. This is advantageous to allow selection of drive plate and free plate optical surfaces, 114 and 120 respectively, field of regard when operating reflector array 100.

To exit the offset position, the linear actuator 220 is retracted, thereby allowing for the drive plate finger 204 to rotate towards and along the first roller 212, and disengaging the drive plate 110 from the free plate 116. After exiting the offset position, the reflector array 100 may return to the fully closed position or the fully open position.

Figure 3:
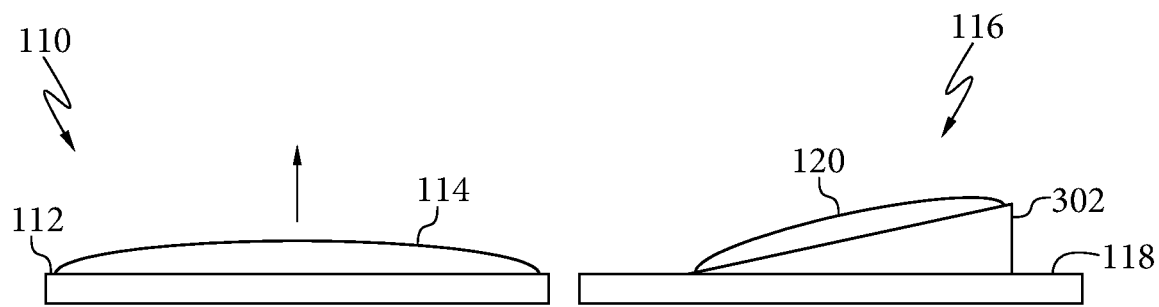
FIG. 3 depicts an optical surface for a reflector array, according to one or more embodiments shown and described herein.

Referring now to FIG. 3, a side view of the drive plate 110 and the free plate 116 is shown, according to some embodiments. In these embodiments, and as depicted in FIG. 3, the free plate 116 includes one or more offset platforms 302, each said offset platform 302 supporting one or more optical surfaces 120 of free plate 116. However, the drive plate 110 and/or the free plate 116 may include the offset platform(s) 302. The offset platform(s) 302 may be coupled to or are integrated with the drive plate 110 and/or the free plate 116. Each offset platform 302 is configured to facilitate defined relative pointing coordinates for varying field of regards of one or more of the optical surfaces. Accordingly, the offset platforms 302 define different planes relative to each other, and thereby the reflector array 100 is configurable to define varying fields of regard for each optical surface 120 of the reflector array 100.

Figure 4:
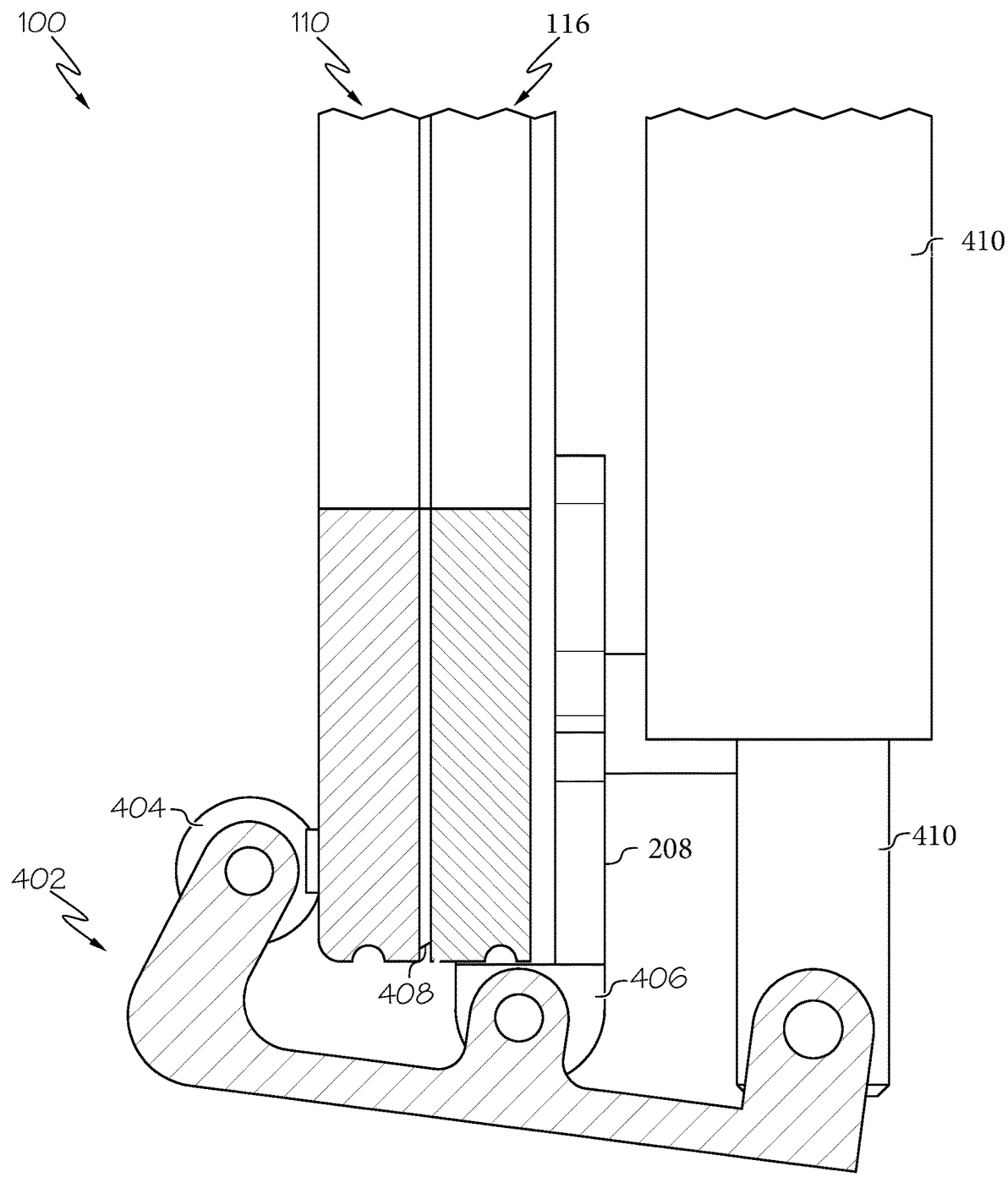
FIG. 4 depicts a closing latching mechanism for a reflector array, according to one or more embodiments shown and described herein.

Referring now to FIG. 4, a closing latching mechanism 402 for the reflector array 100 is shown, according to some embodiments. The closing latching mechanism 402 protects the drive plate 110 and the free plate 116 in a fully closed position of the reflector array 100 from the environment of the reflector array 100. The closing latching mechanism 402 includes a pivoting roller 406 and a closing roller 404. The closing latching mechanism 402 is rotatably coupled to a linear actuator 410. The linear actuator 410 utilized for the closing latching mechanism 402 may be a second linear actuator, or may be the same linear actuator referred to in FIG. 2A-2B (e.g., linear actuator 220).

To initiate the fully closed position, the motor 108 rotates the drive plate 110 past the closing roller 404 until the drive plate first side 112 faces the free plate first side 118. The pivoting roller 406 may define a planar surface, and is configured to pivot, so that the free plate 116 and the drive plate 110 rest on the same plane. In this way, there is improved sealing between the drive plate 110 and the free plate 116. After the drive plate 110 and the free plate 116 are placed so that the drive plate 110 and the free plate 116 face each other, the linear actuator 410 may then be actuated. This causes the closing latching mechanism 402 to hinge about pivoting roller 406, thereby causing the closing roller 404 roll along a portion of the second side of drive plate 110 and apply a pushing force onto the drive plate 110 and towards the free plate 116. In this way, the drive plate 110 and the free plate 116 may be sealed to each other, thereby protecting the optical surfaces of each the drive plate 110 and the free plate 116 from the environment (e.g., dust, debris, animals, snow, rain, etc.,) when the reflector array 100 is not in use.

As depicted in FIG. 4, a perimeter of the free plate 116 may include a sealing member 408 (e.g., gasket, O-ring). However, the drive plate 110 and/or the free plate 116 may include the sealing member 408. The sealing member 408 applies an additional seal for the drive plate 110 and the free plate 116 from the environment. In this way, the optical surfaces of the drive plate 110 and the free plate 116 may be further protected from the environment when the reflector array 100 is not in use.

Figure 5B:
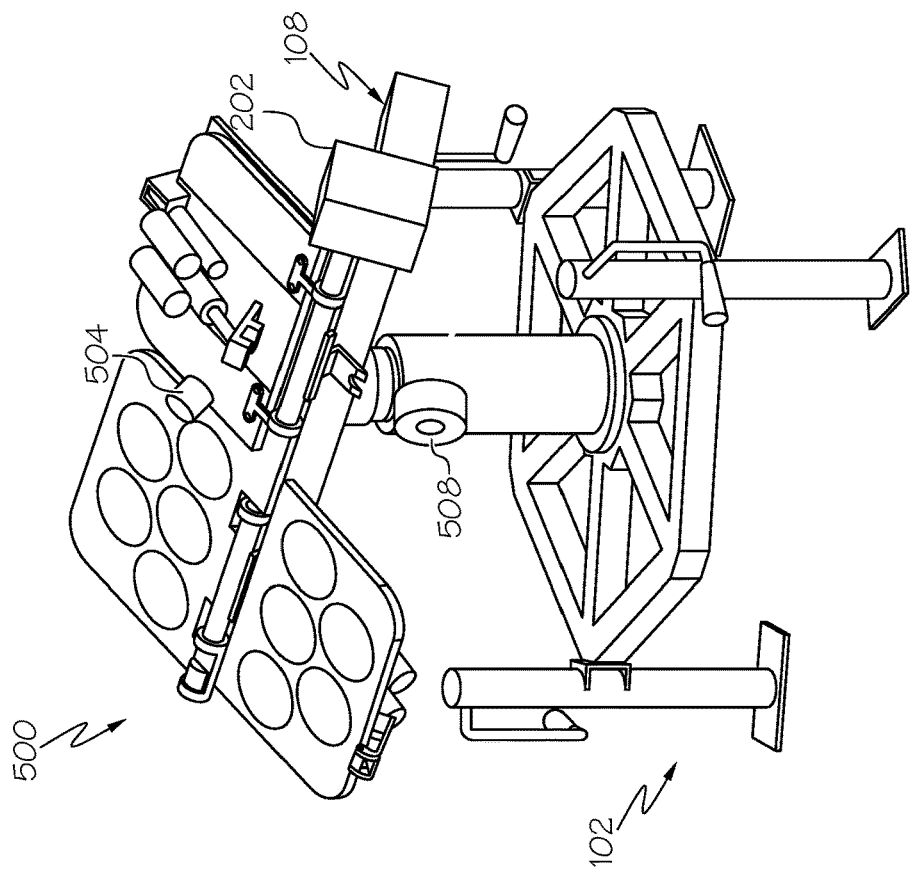
FIG. 5B schematically depicts the reflector array of FIG. 5A with the optical head and calibration depot in use.
Figure 5A:
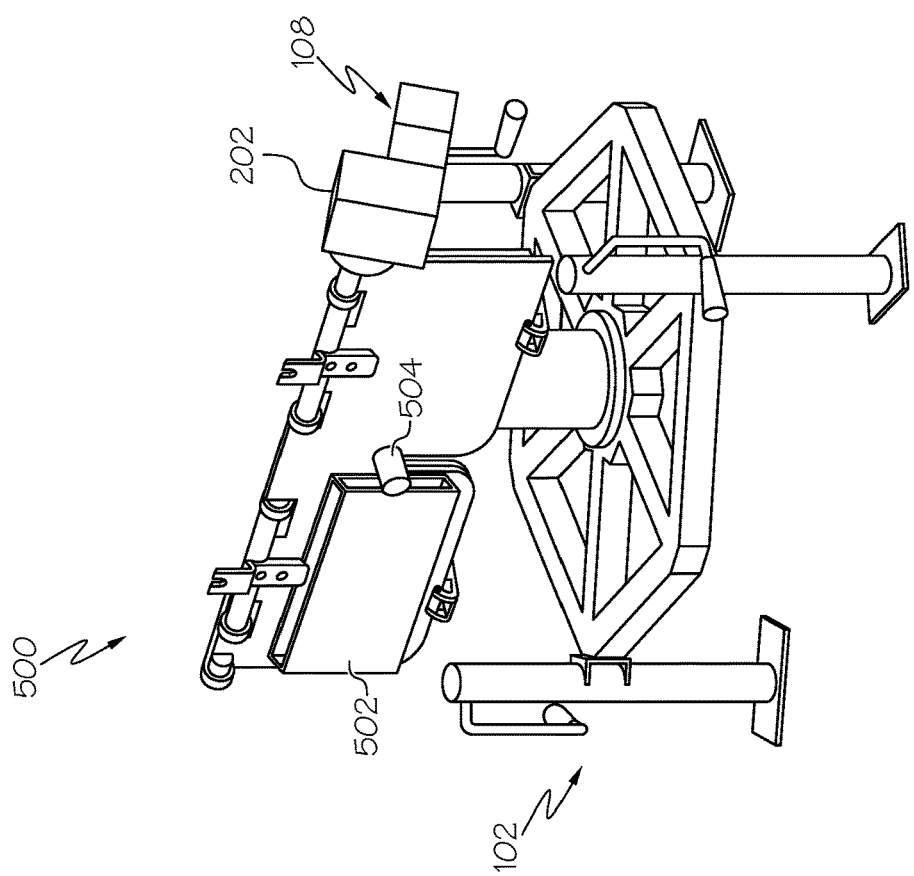
FIG. 5A schematically depicts another reflector array having an instrument box and an optical head, according to one or more embodiments shown and described herein.

Referring now to FIGS. 5A-5B, a reflector array 500 is shown according to some embodiments. The FIGS. 5A-5B includes an instrument box 502, an optical head 504, and a calibration depot 508. The instrument box 502, the optical head 504, and the calibration depot 508 collectively operate as a radiometer that is integrated with the reflector array 500. The radiometer measures radiant energy from an illumination source emitting electromagnetic radiation.

The instrument box 502 is disposed on a second side of the drive plate of the reflector array 500. The instrument box 502 is a sealed and thermally controlled chamber. The instrument box 502 is communicatively coupled to the optical head 504 and may contain a variety of measuring instruments.

The optical head 504 may include optical elements, a viewing aperture, an optical camera, sensors for measuring solar vectors and direction offsets, and spectrophotometers. The optical head 504 protrudes from the second side 119 of the free plate of the reflector array 500. As depicted in FIG. 5B, the optical head 504 observes the illumination source from its viewing aperture when the free plate is not in use. This is advantageous as it places the measuring instruments closely to the optical surfaces. In this way, there is no longer a need for the optical surfaces to be communicatively coupled to the instrument box 502. This may reduce errors typically caused by positional changes when optical surfaces are connected to the instrument box via a fiber. Further, the optical head 504 may be used to measure the illumination source. To do so, the optical head 504 may be configured to first measure an illumination source, then measure an imaging system, and then the illumination source again. Although depicted being on the underside of the free plate, the optical head 504 may be disposed anywhere along the reflector array 500 (e.g., including the first side of the free plate, the first side of the drive plate, the second side of the drive plate). The measurements taken by the optical head 504 are performed independently of the one or more optical surfaces of the reflector array 500 relaying the measurements of the illumination source to the target sensor in overpass. In other words, the reflector array 500 may perform the relaying, via the one or more optical surfaces, at a first time and perform the measurement, via the optical head 504, at a second time. In doing so, the reflector array 500 may measure the illumination source immediately before or after relaying the illumination source to the target sensor.

The reflector array 500 includes a calibration depot 508 that is sized and shaped to receive the optical head 504 and is disposed on a support structure of the reflector array 500. In a calibration position of the reflector array 500, the optical head 504 is placed (e.g., docked) into the calibration depot 508. To place the optical head 504 into the calibration depot 508, the drive plate is rotated until the optical head 504 enters into the calibration depot 508. The calibration depot 508 is configured to prevent any light leakage into the calibration depot 508 during the calibration position. Further, the calibration depot 508 may be environmentally sealed to protect the optical head 504 from environmental egress (e.g., dust, water, snow). The calibration depot 508 may be configured to provide a defined illumination source. In this way, the optical head 504 may be calibrated by measuring the defined illumination source emitted from the calibration depot 508.

Referring now to FIGS. 6A-6E, a process of opening the reflector array 100 having two drive plates and two free plates, is shown according to some embodiments. As shown, the drive plates are rotatably coupled, while the free plates may be independently activated, thereby providing the reflector array 100 to be more configurable. However, any number of drive plates and free plates may be used, thereby facilitating for the reflector array 100 to be even more configurable.

Figure 6A:
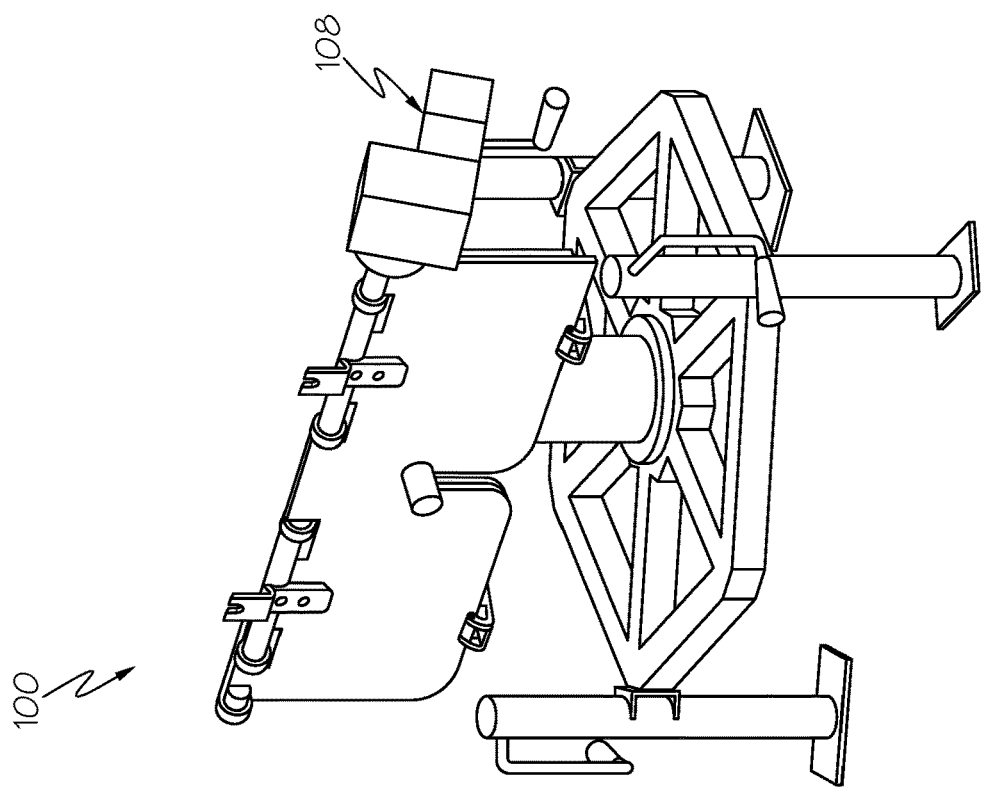
FIG. 6A schematically depicts a reflector array in a first position, according to one or more embodiments shown and described herein.

In FIG. 6A, the reflector array 100 is shown in a first position, or the fully closed position. In these embodiments, none of the plates of the reflector array 100 are in use. Additionally, each of the drive plates may be closed and sealed to each of the free plates via closing latching mechanisms, as described in greater detail above.

In FIG. 6B, the reflector array 100 is shown in a second position. In the second position, the first drive plate 110 and the first free plate 116 are in the offset position. Accordingly, the first drive plate 110 is in use while the first free plate 116 is not in use. To enter the second position, both the first drive plate 110 and the second drive plate 122, which is contiguous to the first drive plate 110, are rotated by the shaft via the motor. A drive plate finger of the first drive plate 110 is then engaged with the first free plate 116, thereby rotatably coupling the first drive plate 110 to the first free plate 116.

Referring now to FIG. 6C, the reflector array 100 is shown in a third position. In the third position, the first drive plate 110 and the first free plate 116 are both placed on the same plane, or the fully open position. In the fully open position, both the first drive plate 110 and the first free plate 116 are in use and are rotatably coupled via the drive plate finger of the first drive plate 110 being engaged within the latching mechanism of the first free plate 116. The rotational position of the first drive plate 110 and the first free plate 116 may be controlled by the shaft via the motor.

Referring now to FIG. 6D, the reflector array 100 is shown in a fourth position. In the fourth position, the first drive plate 110 and the second drive plate 122 are in the offset position relative to the first free plate 116 and the second free plate 128, respectively. In these embodiments, the first drive plate 110 and the second drive plate 122 are both in use, while the first free plate 116 and the second free plate 128 are not in use. Each drive plate finger of the first drive plate 110 and the second drive plate 122 are engaged within the latching mechanism of the first free plate 116 and the second free plate 128, respectively.

Figure 6F:
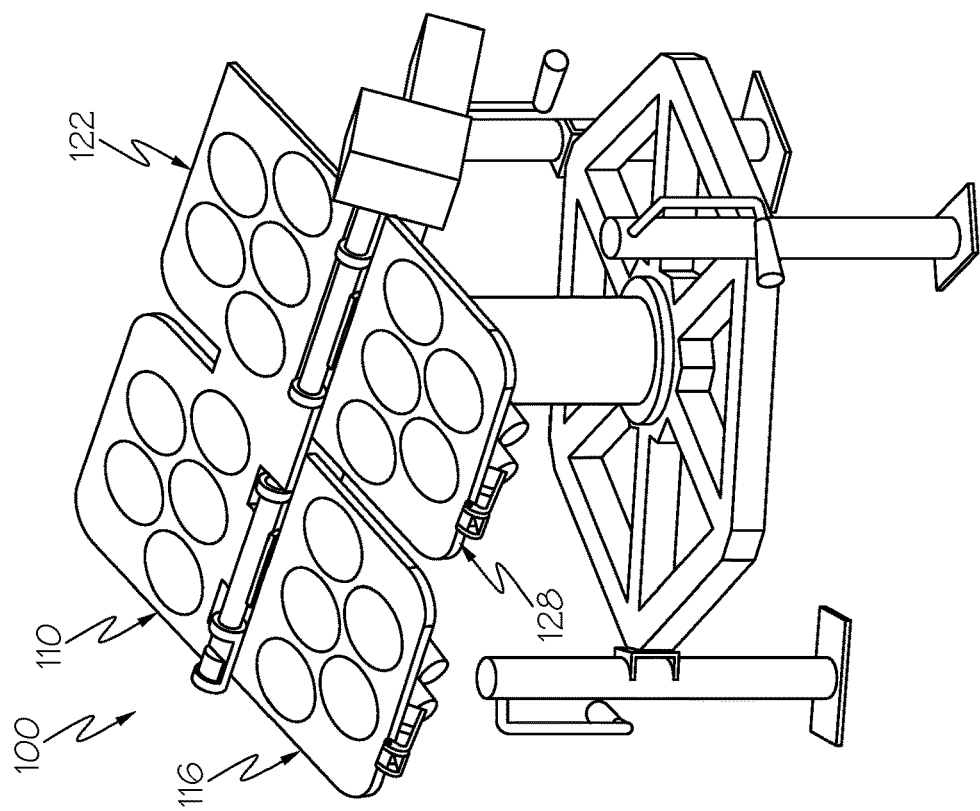
FIG. 6F schematically depicts the reflector array of FIG. 6A in a sixth position.
Figure 6E:
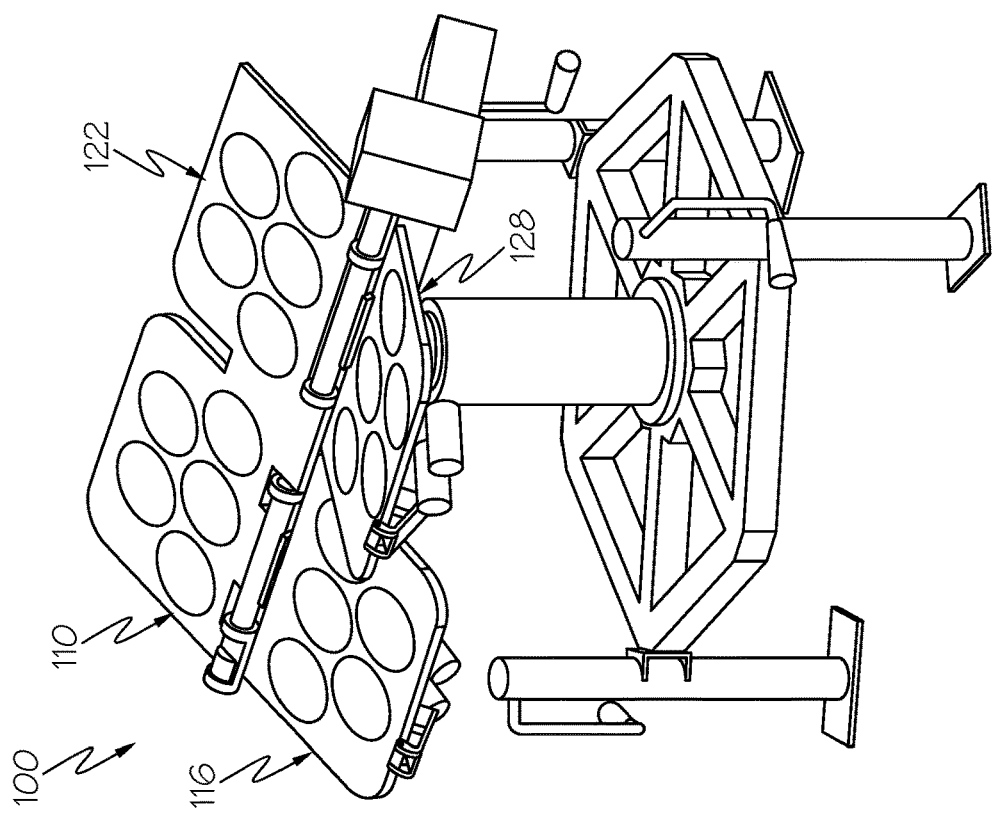
FIG. 6E schematically depicts the reflector array of FIG. 6A in a fifth position.

Referring now to FIG. 6E, the reflector array 100 is shown in a fifth position. In the fifth position, the first drive plate 110 and the first free plate 116 are both placed on the same plane, or the fully open position. Additionally, the second drive plate 122 is in the offset position relative to the second free plate 128. Independent control of each pair of plates may be achieved by independently actuating linear actuators for the respective pair of plates. In this way, the reflector array 100 may be configurable to achieve the fields of regard required by the reflector array 100. As depicted in FIG. 6E, the first drive plate 110, the first free plate 116, and the second drive plate 122 are in use while the second free plate 128 is not in use.

Referring now to FIG. 6F, the reflector array 100 is shown in a sixth position. In the sixth position, the first drive plate 110 and the second drive plate 122 are in the fully open position relative to the first free plate 116 and the second free plate 128, respectively. In these embodiments, all of the plates are in use. Each drive plate finger of the first drive plate 110 and the second drive plate 122 are engaged within the latching mechanism of the first free plate 116 and the second free plate 128, respectively.

Figure 7A:
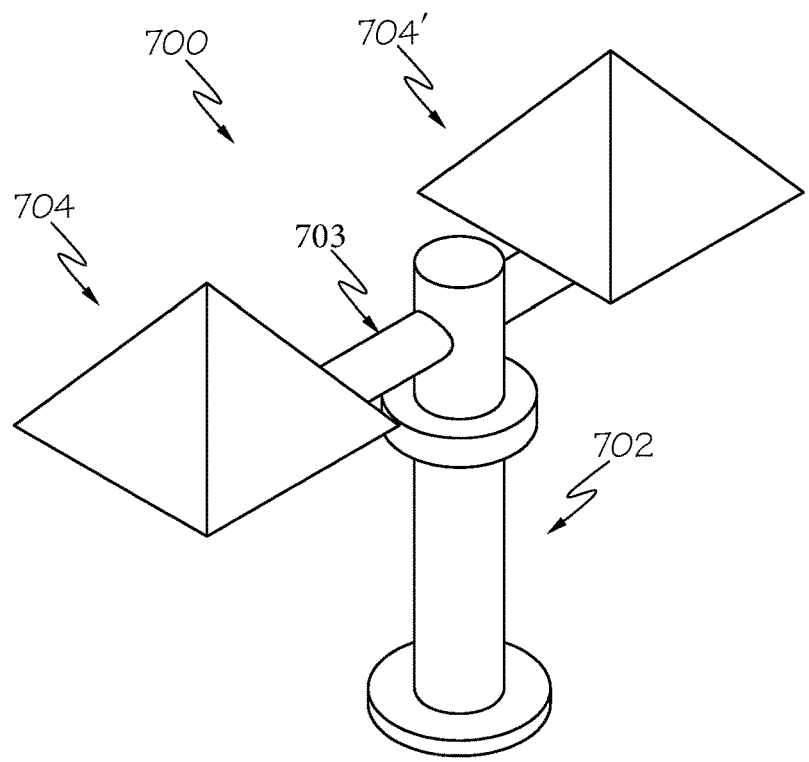
FIG. 7A schematically depicts another reflector array in a closed position, according to one or more embodiments shown and described herein.
Figure 7B:
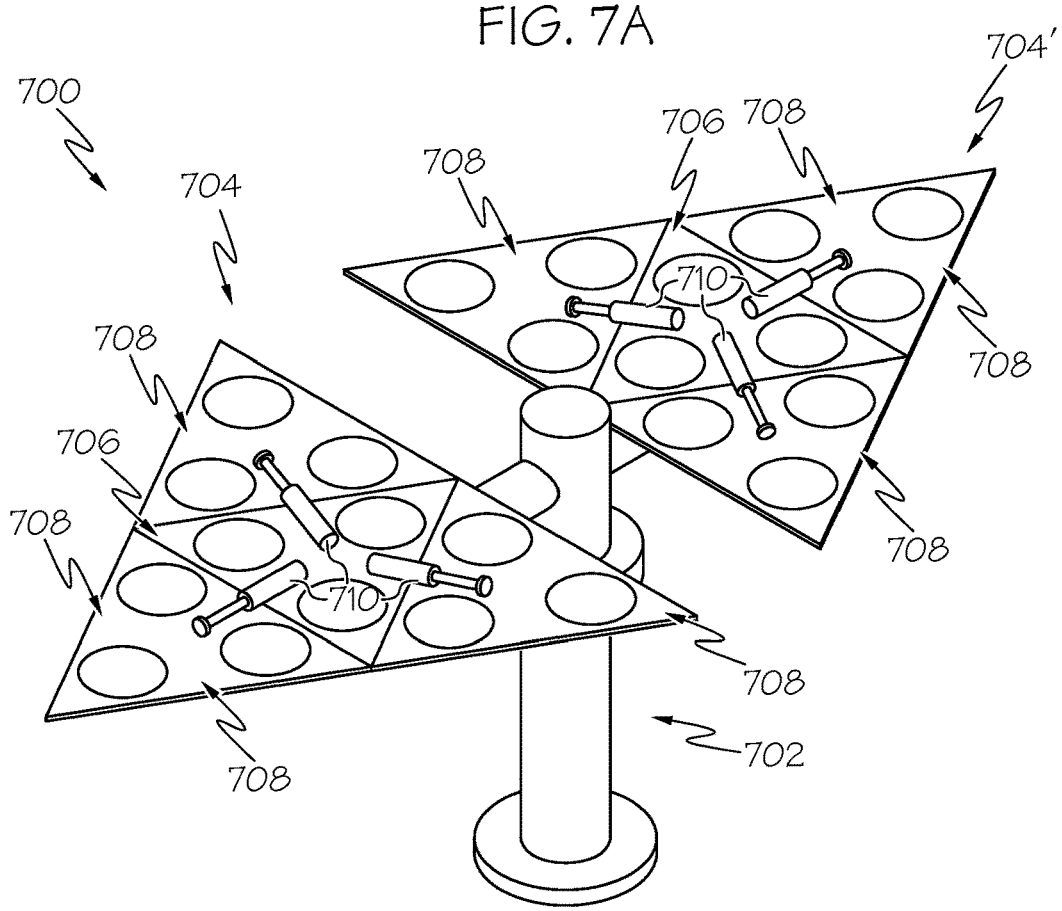
FIG. 7B schematically depicts the reflector array of FIG. 7A in an open position.

Referring now to FIGS. 7A-7B, a system 700 is shown, according to some embodiments. The system 700 includes a support structure 702, a support bar 703, and a first reflector array 704. In embodiments, the system 700 includes a second reflector array 704'. The support structure 702 may include one or more legs mounted to the floor. The support structure 702 may be coupled (e.g., via fastening, welding) to the floor to further support the system 700 during movement of the system 700. The support bar 703 is disposed between the support structure 702 and the first reflector array 704. The support bar 703 may also be disposed between the support structure 702 and the second reflector array 704'.

In FIG. 7A, the system 700 is shown in a closed position (e.g., an unused position of the first reflector array 704 and the second reflector array 704'). The system 700 may include a rotational actuator operatively coupled to the support structure 702. The rotational actuator is configured to rotate a position of the support bar 703 about a longitudinal axis of the support structure 702. In other words, the rotational actuator may rotate the position of the first reflector array 704 and the second reflector array 704'.

The system 700 may further include an angular actuator operatively coupled to the support bar 703. The angular actuator is configured to translate an angle of the support bar 703 relative to the longitudinal axis of the support structure 702. In other words, the angular actuator may translate an angle of the first reflector array 704 and the second reflector array 704'.

In FIG. 7B, the system 700 is shown in a fully open position. In the fully open position, each of the first reflector array 704 and the second reflector array 704' have exposed optical surfaces. These optical surfaces may be similarly constructed to the optical surfaces of reflector array 100.

The first reflector array 704 and the second reflector array 704' may each include a base plate 706 having a first edge, a second edge, and a third edge. The first reflector array 704 and the second reflector array 704' may each further include a plurality of side plates 708 (e.g., a first plate, a second plate, a third plate) surrounding the base plate 706. Each of the plurality of side plates 708 abut an edge of the base plate 706 (e.g., the first edge, the second edge, and the third edge). Each of the plurality of side plates 708 may include a sealing member along a perimeter of each of the plurality of side plates 708. The sealing member may protect the first and second reflector array 704, 704' similar to the sealing member disclosed in greater detail above.

The first reflector array 704 and the second reflector array 704' may each further include one or more actuators 710 (e.g., a first actuator, a second actuator, a third actuator). The one or more actuators 710 may be an electromechanical actuator, a linear actuator, a pneumatic actuator, or hydraulic actuator. Each of the one or more actuators 710 extend from the base plate 706 a side plate of the plurality of side plates 708. Further, each of the one or more actuators 710 hingedly couples one of the plurality of side plates 708 to the base plate 706. In the closed position, each of the one or more actuators 710 hinge the respective side plate of the plurality of side plates 708 until each of the reflector arrays 704, 704' form an enclosed pyramid or tetrahedron shape (e.g., where a first side and second side of each of the first plate, second plate, and the third plate intersect at an intersection point). In the fully open position, each of the one or more actuators 710 hinge the respective side plate of the plurality of side plates 708 until each of the reflector arrays 704, 704' form a substantially planar profile (e.g., where the first side and second side of each of the first plate, second plate, and the third plate and the base plate define a plane). Further, each of the one or more actuators 710 independently hinge the respective side plate of the plurality of side plates 708 to a desired position (e.g., between the closed position and the fully open position of each of the plurality of side plates 708).

Figure 8A:
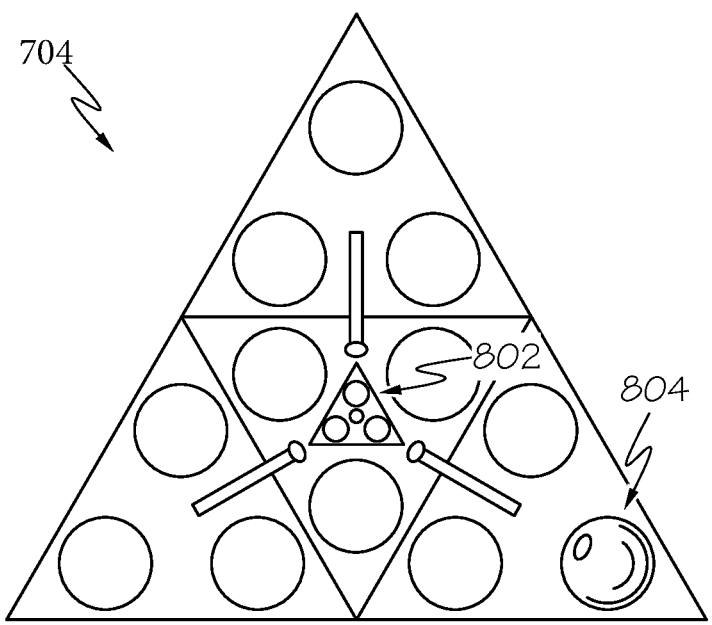
FIG. 8A schematically depicts an optical surface of the reflector array of FIG. 7A.

Referring now to FIG. 8A, the first reflector array 704 is shown from a top view. The first reflector array includes an instrument cluster 802 disposed within the base plate 706 and a calibration depot 804 disposed on one of the plurality of side plates 708. The instrument cluster 802 may be similarly structured to the instrument box 502 of FIGS. 5A-5B. Further, the calibration depot 804 may be similarly structure to the calibration depot 508 of FIGS. 5A-5B. The instrument cluster 802 defines an instrument axis that is perpendicular to a top surface of the base plate 706. The calibration depot 804 includes a receiving aperture, which defines a receiving axis. In doing so, in the fully closed position, the instrument cluster 802 and the calibration depot 804 are protected from environmental egress, which maintains the surfaces of the instruments to be clear. Further, the instrument cluster 802 and the calibration depot 804 do not need to be physically connected (e.g., via a cable, fibers), which may be damaged during movement of the first reflector array 704. In this way, the system 700 defines a more robust design and mitigates potential sources of error from positional changes caused by positional changes from cables, fibers, etc.

In the fully closed position, the receiving axis and the instrument axis are coincident (e.g., share the same axis). By aligning the receiving axis and the instrument axis, the instrument cluster 802 may be calibrated by a defined illumination sourced emitted by the calibration depot 804 in the fully closed position. Although depicted that the instrument cluster 802 is positioned in a central position of the base plate and the calibration depot 804 is positioned at an end of a side plate, the instrument cluster 802 and the calibration depot 804 may be positioned anywhere along the first reflector array 704, where the receiving axis and the instrument axis are aligned. For example, the instrument cluster 802 may be disposed near an outer edge of the base plate and the calibration depot 804 may be disposed near an inner edge of an adjacent base plate.

Figure 8B:
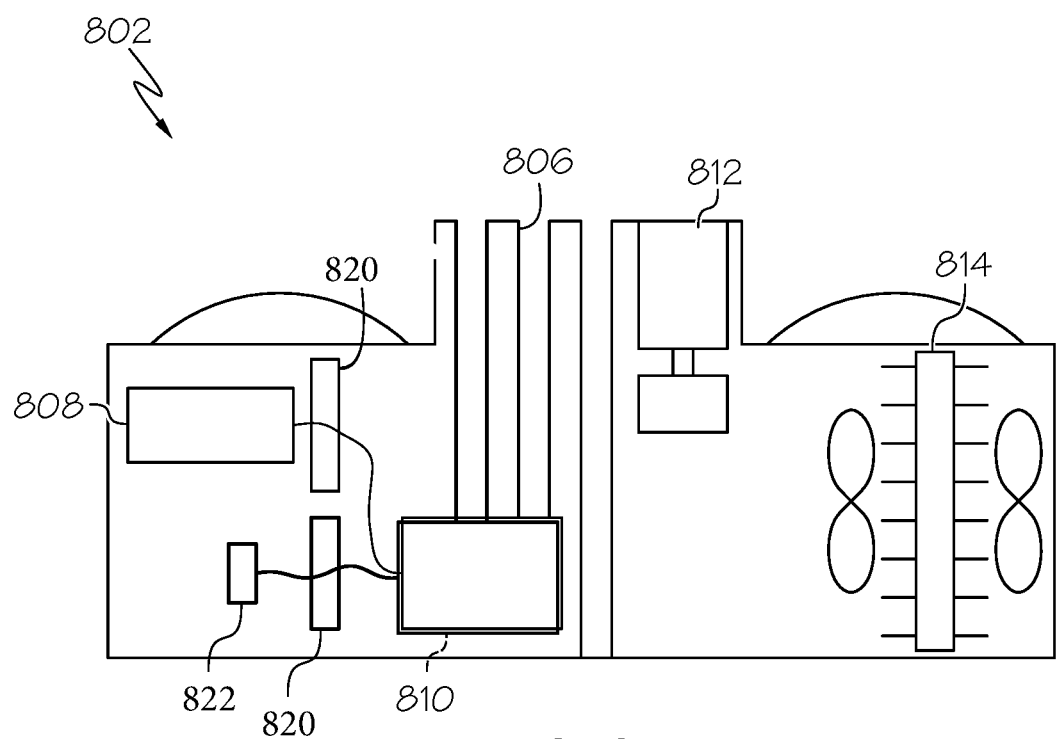
FIG. 8B schematically depicts a cross-sectional view of an instrument box of the reflector array of FIG. 7A.

Referring now to FIG. 8B, the instrument cluster 802 of the first reflector array 704 is shown from a cross-sectional side view. The instrument cluster 802 includes a spectrometer 808, a detector 822, one or more optical heads 806, an optical receiving instrument 810, an optical camera 812, and a thermal control 814. The one or more optical heads 806 includes apertures extending from a top surface of the first reflector array 704 to the optical receiving instrument 810 and may receive illumination from an illumination source. The one or more optical heads 806 may be a two-channel optical head for measuring varying wavelength ranges. The optical receiving instrument 810 may make measurements based on the received illumination through the one or more optical heads 806 and provide the measurements to the spectrometer 808. The optical receiving instrument 810 may have two inputs and two outputs and define optical paths. The spectrometer 808 may use this information for measurements and/or calibrating the first reflector array 704. The spectrometer may be operatively coupled to an optical indexing mechanism 820 having filters or apertures that is disposed between the spectrometer 808 and the optical receiving instrument 810. The detector 822 is an Indium Gallium Arsenide (InGaAs) detector for detecting shortwave infrared (SWIR) bands. The detector 822 is operatively coupled to a second optical indexing mechanism 820 having filters or apertures that is disposed between the detector 822 and the optical receiving instrument 810.

The optical camera 812 may also be used for making measurements of the illumination source and/or calibration of the first reflector array 704. The thermal controls 814 may be used to cool a temperature of the instrument cluster 802.

Figure 9:
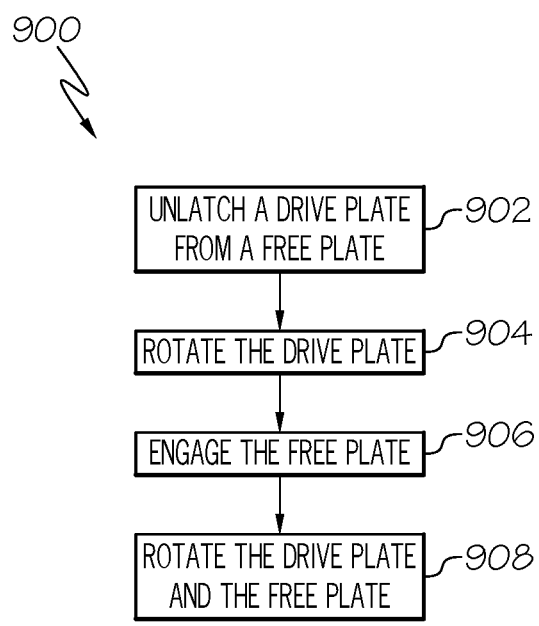
FIG. 9 depicts a method of operating a reflector array, according to one or more embodiments shown and described herein.

Referring now to FIG. 9, a method 900 is shown for operating a reflector array (e.g., such as reflector array 100). The method 900 includes step 902, which includes unlatching a drive plate of the reflector array from a free plate of the reflector array. The method 900 includes step 904, which includes rotating the drive plate via a shaft of the reflector array. The method 900 includes step 906, which includes engaging the free plate using a drive plate finger of the drive plate, thereby rotatably coupling the drive plate to the free plate. The method 900 includes step 908, which includes rotating the drive plate and the free plate together relative to the shaft.

Figure 10:
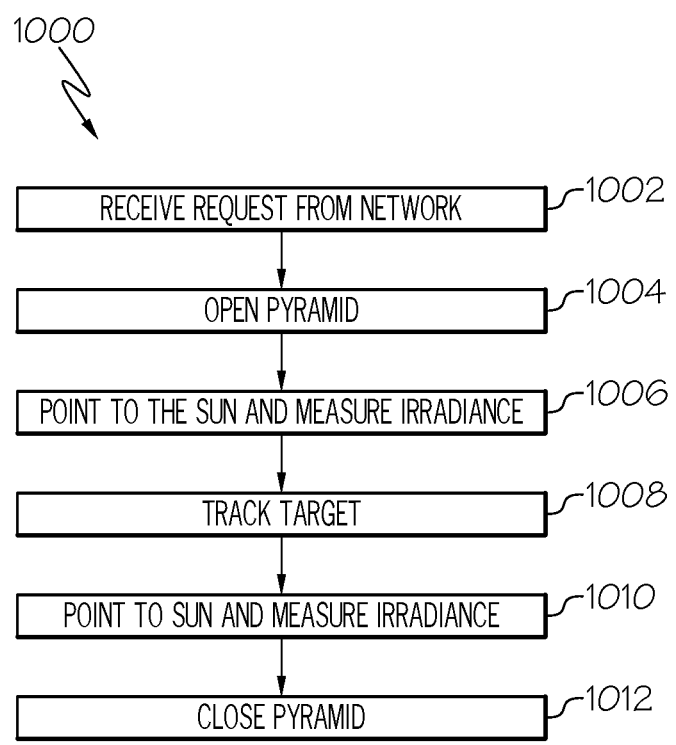
FIG. 10 depicts another method of operating a reflector array, according to one or more embodiments shown and described herein.

Referring now to FIG. 10, a method 1000 is shown for orienting an instrument cluster (e.g., such as instrument cluster 802) for any reflector array disclosed herein, such as reflector array 100, 500, 704, 704'. The method 1000 includes step 1002, which includes receiving a request from a network to have the instrument cluster perform a measurement. The method 1000 further includes step 1004, which includes opening the reflector array. The method 1000 further includes step 1006, which includes pointing the instrument cluster to the sun or another illumination source, so that it may measure irradiance. The method 1000 further includes step 1008, which includes moving the reflector array to track a target (e.g., satellite, sensors). The method 1000 further includes step 1010, which includes pointing the instrument cluster again back to the sun to measure irradiance. The method 1000 further includes step 1012, which includes closing the reflector array.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A reflector array comprising:
   a support structure;
   a motor;
   a shaft operatively coupled to the motor;
   a free plate defining a free plate plane, the free plate comprising:
      a free plate first side and a free plate second side axially opposed to the free plate first side; and
      one or more free optical surfaces disposed on the free plate first side; and
   a drive plate defining a drive plate plane and being rotatably coupled to the shaft, the drive plate comprising:
      a drive plate first side and a drive plate second side axially opposed to the drive plate first side;
      one or more drive optical surfaces disposed on the drive plate first side; and
      a drive plate finger coupled to the drive plate second side, the drive plate finger extending from the drive plate second side to the free plate second side, the drive plate finger configured to:
         contact the free plate in response to rotation of the drive plate; and
         in response to contacting the free plate, couple the drive plate to the free plate.

2. The reflector array of claim 1, wherein:
   the free plate further comprises a latching mechanism disposed on the free plate second side configured to contact the drive plate finger in response to rotation of the drive plate, thereby rotatably coupling the drive plate to the free plate;
   contacting the latching mechanism by the driver plate finger places the reflector array in a fully open position; and
   in response to being in the fully open position, the free plate plane and the drive plate plane are placed upon a same plane.

3. The reflector array of claim 2, wherein the latching mechanism comprises:
   a first roller and a second roller, the first roller and the second roller defining a finger receiving area between the first roller and the second roller,
   wherein in an offset position, the drive plate finger is configured to:
      rotate along the first roller;
      be received within the finger receiving area;
      contact the second roller; and
      in response to the drive plate finger contacting the second roller, couple the drive plate to the free plate.

4. The reflector array of claim 3, further comprising an actuator configured to apply a force upon the latching mechanism in a fully open position.

5. The reflector array of claim 3, wherein the latching mechanism further comprises a spring mechanism configured to facilitate for the drive plate finger to be received within the finger receiving area in the offset position.

6. The reflector array of claim 1, further comprising:
   a closing latching mechanism configured to hold the drive plate to the free plate in a closed position of the reflector array, the closing latching mechanism comprising:
      a first roller comprising:
         a first roller side;
         a second roller side parallel to the first roller side; and
         a third roller side contiguous to the first roller side and the second roller side, the third roller side perpendicular to the first roller side and the second roller side, the third roller side configured to engage the free plate in the closed position; and
      a second roller configured to engage the drive plate in the closed position; and
   an actuator hingedly coupled to the closing latching mechanism.

7. The reflector array of claim 1, wherein:
   the drive plate further comprises a sealing member disposed on an outer perimeter of the drive plate first side.

8. The reflector array of claim 1, further comprising:
   a second free plate; and a second drive plate rotatably coupled to the shaft, the second drive plate comprising a second drive plate finger configured to rotatably couple the drive plate to the free plate.

9. The reflector array of claim 1, wherein:

the free plate further comprises one or more offset platforms, each defining an offset plate tangential to the free plate plane, wherein each of the one or more free optical surfaces are disposed on an offset platform of the one or more offset platforms.

10. The reflector array of claim 9, wherein:

a first offset plane of the one or more offset platforms is nonparallel to a second offset plate of the one or more offset platforms.

11. The reflector array of claim 1, further comprising:

an optical head disposed on the drive plate second side; and a calibration depot sized to receive the optical head, the calibration depot disposed on the support structure, wherein in a calibration position of the reflector array, the drive plate rotates such that the calibration depot is received within the optical head.

12. The reflector array of claim 11, further comprising:
an instrument box communicatively coupled to the optical head and the calibration depot.

13. An assembly comprising:
a support structure;
a reflector array, comprising:
  a base plate comprising:
    a first edge, a second edge, and a third edge; and
    one or more base optical surfaces;
  a first plate hingedly coupled to the first edge, the first side comprising one or more first plate optical surfaces;
  a second plate hingedly coupled to the second edge, the second side comprising one or more second plate optical surfaces; and
  a third plate hingedly coupled to the third edge, the third side comprising one or more third plate optical surfaces, wherein:
  in a closed position, a first side and second side of each of the first plate, second plate, and the third plate intersect at an intersection point; and
  in a fully open position, the first side and second side of each of the first plate, second plate, and the third plate and the base plate define a plane.

14. The assembly of claim 13, further comprising:
a first actuator rotatably coupled to the first plate;
a second actuator rotatably coupled to the second plate; and
a third actuator rotatably coupled to the third plate.

15. The assembly of claim 13, further comprising:
a support bar disposed between the support structure and the reflector array and disposed between the support structure and a second reflector array of the assembly.

16. The assembly of claim 15, further comprising:
an angular actuator operatively coupled to the first support bar, the angular actuator configured to translate an angle of the first support bar.

17. The assembly of claim 16, further comprising:
a rotational actuator operatively coupled to the support structure, the rotational actuator configured to rotate a position of the first support bar about a longitudinal axis of the support structure.

18. The assembly of claim 13, further comprising:
an instrument cluster disposed within the base plate, the instrument cluster defining an instrument axis relative to a surface of the base plate; and
a calibration depot disposed on the first plate, the calibration depot comprising a receiving aperture defining a receiving axis, the receiving axis and the instrument axis being coincident in the closed position.

19. The assembly of claim 13, wherein each of the first plate, the second plate, and the third plate comprise a sealing member disposed on an outer perimeter of each of the first plate, the second plate, and the third plate.

20. The assembly of claim 13, wherein the first plate comprises one or more offset platforms, each defining an offset plate alternative to a first plate plane.

* * * * *